(12) United States Patent
Zhou et al.

(10) Patent No.: US 9,684,962 B2
(45) Date of Patent: Jun. 20, 2017

(54) METHOD AND SYSTEM FOR CALIBRATING SURVEILLANCE CAMERAS

(71) Applicant: Tsinghua University, Beijing (CN)

(72) Inventors: Jie Zhou, Beijing (CN); Lei Deng, Beijing (CN); Chuan Yu, Beijing (CN); Haoyang Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 14 days.

(21) Appl. No.: 14/765,748

(22) PCT Filed: Jul. 30, 2014

(86) PCT No.: PCT/CN2014/083329
§ 371 (c)(1),
(2) Date: Aug. 4, 2015

(87) PCT Pub. No.: WO2015/085779
PCT Pub. Date: Jun. 18, 2015

(65) Prior Publication Data
US 2015/0371385 A1    Dec. 24, 2015

(30) Foreign Application Priority Data

Dec. 10, 2013 (CN) .......................... 2013 1 0670982

(51) Int. Cl.
*G06K 9/00* (2006.01)
*G06T 7/00* (2017.01)
(Continued)

(52) U.S. Cl.
CPC ........ *G06T 7/0018* (2013.01); *G06K 9/00771* (2013.01); *G06T 7/80* (2017.01);
(Continued)

(58) Field of Classification Search
None
See application file for complete search history.

(56) References Cited

U.S. PATENT DOCUMENTS

| 2006/0221072 A1* | 10/2006 | Se ...................... G01C 11/06 345/420 |
| 2012/0320162 A1* | 12/2012 | Lo ...................... H04N 13/0007 348/47 |
| 2013/0070048 A1* | 3/2013 | Huang ............... H04N 13/0242 348/36 |

FOREIGN PATENT DOCUMENTS

| CN | 101630406 A | 1/2010 |
| CN | 101894369 A | 11/2010 |
| CN | 103824278 A | 5/2014 |

* cited by examiner

*Primary Examiner* — Hadi Akhavannik
(74) *Attorney, Agent, or Firm* — Kile Park Reed & Houtteman LLC (57) ABSTRACT

A method and a system for calibrating a plurality of surveillance cameras are provided. The method includes: sampling a plurality of first images in a monitoring scene of the plurality of surveillance cameras by a sampling device and sampling a second image by each of the plurality of surveillance cameras; performing a feature matching on the plurality of first images to obtain a matching result between the plurality of first images; reconstructing a three-dimensional point set of the monitoring scene according to the matching result between the plurality first of images; and calculating parameters of each of the plurality of surveillance cameras according to the three-dimensional point set and the second image sampled by each of the plurality of surveillance cameras.

10 Claims, 3 Drawing Sheets

(51) Int. Cl.
*H04N 7/18* (2006.01)
*G06T 7/80* (2017.01)
(52) U.S. Cl.
CPC ... *H04N 7/181* (2013.01); *G06T 2207/10016* (2013.01); *G06T 2207/10028* (2013.01); *G06T 2207/30232* (2013.01)

METHOD AND SYSTEM FOR CALIBRATING SURVEILLANCE CAMERAS

CROSS REFERENCE TO RELATED APPLICATION

This application is a continuation application of International Application No. PCT/CN2014/083329, filed with the State Intellectual Property Office of P. R. China on Jul. 30, 2014, which claims priority and benefits of Chinese Patent Application No. 201310670982.0, filed with State Intellectual Property Office on Dec. 10, 2013, the entire content of which is incorporated herein by reference.

FIELD

Embodiments of the present disclosure generally relate to an image processing technology, and more particularly, to a method and a system for calibrating a plurality of surveillance cameras.

BACKGROUND

Video monitoring is an important part of a safeguard system, in which one key issue is how to calibrate surveillance cameras in a monitoring scene to obtain their intrinsic parameters (such as a coordinate of a principle point, a focal length and a distortion factor) and external parameters (such as a rotation matrix and a translation vector of a coordinate system of the surveillance camera with respect to a universal coordinate system) thereof, so as to obtain a relative erecting position, a facing direction and a viewing filed of each surveillance camera in the safeguard system.

Currently, there are three calibrating methods for the surveillance camera: a conventional calibrating method, a calibrating method based on active vision and a self-calibrating method. In the conventional calibrating method, an precisely machined calibration object (such a calibration block, a calibration plate or a calibration bar) is placed in the viewing field of the surveillance camera, and then the intrinsic and external parameters of the surveillance camera are obtained by establishing a relationship between a given coordinate of a point on the calibration object and a coordinate of the point on an image. This method wastes time and energy because above operation is required to be performed on each surveillance camera, and only the intrinsic parameters can be calibrated by this method. Furthermore, since the outdoor monitoring scene is usually large and a size of the calibration object is relatively small and occupies a little proportion of the image, a calibration error of this method is large. In the calibrating method based on active vision, the surveillance camera is controlled actively to move in a special mode (such as a pure translation motion or a rotation around an optical center), and the intrinsic parameters of the surveillance camera are calculated according to the specificity of the motion. However, since most of the surveillance cameras are installed on the fixed location and the motion thereof is hard to control, this method has a poor applicability. Furthermore, with this method, it is also required to calibrate each surveillance camera respectively, thus wasting time and energy, and moreover, the external parameters cannot be calibrated. In the self-calibrating method, no calibration object is needed and the surveillance camera is not required to move in the special mode. The intrinsic and external parameters of the surveillance camera is directly calibrated according to the relationship between pixels on a plurality of images sampled by the surveillance camera (maybe a plurality of surveillance cameras) and constraints of the intrinsic and external parameters. Some self-calibrating methods can calibrate a plurality of surveillance cameras simultaneously by means of a multiple view geometry method. However, the viewing fields of the plurality of surveillance cameras are required to have a large area overlapped with each other, otherwise the plurality of surveillance cameras will not be calibrated due to an image matching failure. However, in practice, the overlapped area between viewing fields of the plurality of surveillance cameras is small. Thus, the currently known self-calibrating methods have difficulties in calibrating the plurality of surveillance cameras simultaneously.

SUMMARY

Embodiments of the present disclosure seek to solve at least one of the problems existing in the related art to at least some extent.

For this, one object of the present disclosure is to provide a method for calibrating a plurality of surveillance cameras which can calibrate intrinsic and external parameters of the surveillance cameras having no overlapped viewing field.

Another object of the present disclosure is to provide a system for calibrating a plurality of surveillance cameras which can calibrate intrinsic and external parameters of the surveillance cameras having no overlapped viewing field.

According to embodiments of a first broad aspect of the present disclosure, a method for calibrating a plurality of surveillance cameras is provided. The method includes: sampling a plurality of first images in a monitoring scene of the plurality of surveillance cameras by a sampling device and sampling a second image in the monitoring scene by each of the plurality of surveillance cameras respectively; performing a feature matching on the plurality of first images to obtain a matching result between the plurality of first images; reconstructing a three-dimensional point set of the monitoring scene of the plurality of surveillance cameras according to the matching result between the plurality of first images; and calculating parameters of each of the plurality of surveillance cameras according to the three-dimensional point set and the second image sampled by each of the plurality of surveillance cameras.

According to embodiments of a second broad aspect of the present disclosure, a system for calibrating a plurality of surveillance cameras is provided, and the system includes: at least one sampling device, configured to sample a plurality of first images in a monitoring scene of the plurality of surveillance cameras; and a computing device, configured to perform a feature matching on the plurality of first images to obtain a matching result between the plurality of first images, to reconstruct a three-dimensional point set of the monitoring scene of the plurality of surveillance cameras according to the matching result between the plurality of first images, and to calculate parameters of each of the plurality of surveillance cameras according to the three-dimensional point set and the second image sampled by each of the plurality of surveillance cameras.

With the calibrating method and system according to embodiments of the present disclosure, the three-dimensional point set of the monitoring scene can be accurately reconstructed according to the relatively complete image information of the monitoring scene obtained by the sampling device, and the camera matrices of the surveillance cameras can be calculated according to the relationship between the three-dimensional point set and the feature point set on the second images sampled by the surveillance cameras, thus achieving the calibration of the surveillance cameras. Moreover, the calibrating process is dynamic, i.e., when the number of the reconstructed three-dimensional points is not large enough to calibrate the surveillance cameras, more images can be sampled to expand the reconstructed three-dimensional point set, thus ensuring that all the surveillance cameras can be calibrated. Compared with conventional calibrating methods, the calibrating method in the present disclosure does not require a calibration object, a special motion of the surveillance camera or overlapped viewing fields of the surveillance cameras. Rather, the calibrating method according to embodiments of the present disclosure can calibrate a plurality of surveillance cameras simultaneously as long as the sampling device samples the images of the monitoring scene to associate the viewing fields of the surveillance cameras with each other. The method according to embodiments of the present disclosure does not require the plurality of surveillance cameras to be synchronous, and can deal with conditions in which the viewing fields the surveillance cameras do not overlap with each other. When a street view car is used to sample the images, an intelligent analysis of a surveillance camera network in a city level can be implemented.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

Figure 1:
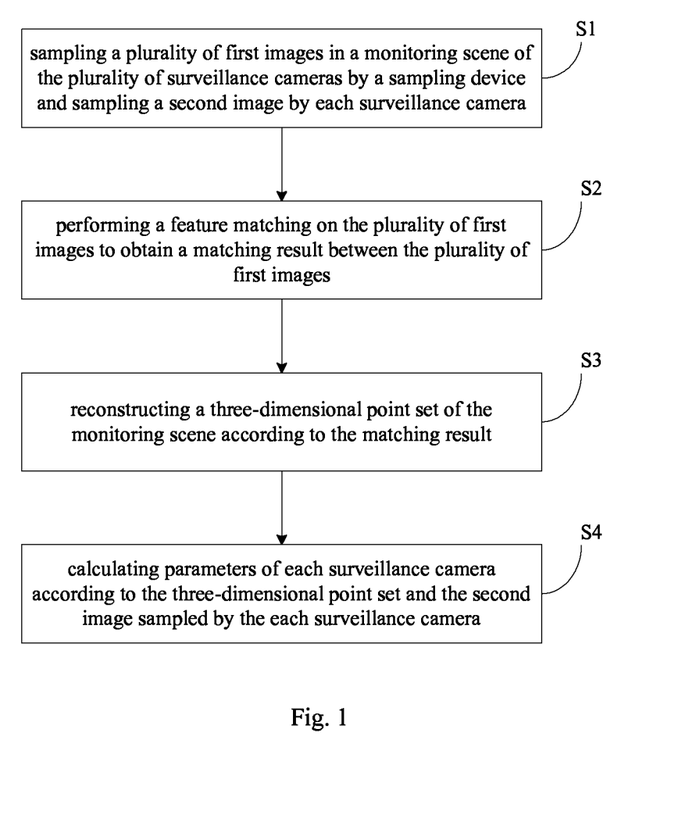
FIG. 1 is a flow chart of a for calibrating a plurality of surveillance cameras according to an embodiment of the present disclosure.

FIG. 1 is a flow chart of a method for calibrating a plurality of surveillance cameras according to an embodiment of the present disclosure. As shown in FIG. 1, the calibrating method according to an embodiment of the present disclosure includes the following steps.

At step S1, a sampling device is used to sample a plurality of first images in a monitoring scene of the plurality of surveillance cameras, and each of the plurality of surveillance cameras is used to sample a second image.

In an embodiment of the present disclosure, intrinsic parameters (such as a focal distance, a length-width ratio, a principal point and a distortion factor) of the sampling device may be calibrated by conventional calibrating methods, such that a precision of a scene reconstruction can be improved, and thus the surveillance camera can be calibrated more precisely. In an embodiment of the present disclosure, the sampling device may be a camera, a cell phone, a PTZ lens or a panoramic sampling device.

Then, the sampling device with calibrated intrinsic parameters samples the plurality of first images or videos in the monitoring scene actively to obtain relatively complete image information of the monitoring scene, thus facilitating a subsequent three-dimensional reconstruction. When the plurality of videos are sampled, the plurality of first images are captured from them. Furthermore, it should be ensured that at least some of the plurality of first images have an area overlapped with a total viewing field of the plurality of surveillance cameras and larger than a predetermined area threshold, such that the plurality of first images can associate the viewing fields of the surveillance cameras with each other. The plurality of first images or videos may be obtained at an equal interval (for example, google street view, baidu street view and soso street view), or may be obtained at an unequal interval (for example, images of the monitoring scene which have been on the internet). In the embodiment of the present disclosure, the plurality of first images or videos sampled by the sampling device and the second images sampled by the surveillance cameras are not required to be synchronous. In the present disclosure, a plurality of sampling devices having different positions and gestures can be used to sample the plurality of first images, or one sampling device can be used to sample the plurality of first images at different positions and with different gestures. In other words, the calibrating method can work as long as the positions and gestures corresponding to the plurality of first images are different from each other.

At step S2, a feature matching is performed on the plurality of first images to obtain a matching result between the plurality of first images.

Specifically, feature points (such as Sift feature points, Surf feature points and Harris feature points) on each first image are firstly extracted to obtain a position and a descriptor of each feature point on the first image. Then, the feature matching is performed on each two first images to obtain the matching relationship between the each two first images. This can be implemented automatically such as by a computer or can be implemented manually (i.e., the feature points matching with each other on the two first images are designated by person). Furthermore, many methods for implementing the feature matching automatically have been presented, such as a feature matching method based on the nearest neighbor ratio constraint of the feature point descriptor (refer to Lowe, D. G., "Distinctive Image Feature from Scale-Invariant Keypoints", International Journal of Computer Vision, 60, 2, pages 91-110, 2004), a feature matching method based on the epipolar geometry constraint of the feature point position (refer to M. A. Fischer and R. C. Bolles, "Random sample consensus: A paradigm for model fitting with applications to image analysis and automated cartography", Commun. Acm, volume 24, pages 381-395, June. 1981) and a feature matching method based on a WGTM algorithm (referto Saeedi P, Izadi M. "A Robust Weighted Graph Transformation Matching for Rigid and Non-rigid Image Registration [J]". 2012), the entire content of which are included herein by reference.

Since a working amount of matching each two first images is huge, in this embodiment, adjacent first images can be obtained firstly and then the adjacent first images are matched with each other, thus reducing the working amount of matching. Specifically, the plurality of first images can be clustered according to Gist global features so as to obtain adjacent images, or a lexicographic tree can be established according to Sift features of the first images to quantize each first image so as to obtain the adjacent images, or GPS location information obtained when the sampling device samples the first images can be used to obtain the adjacent images, or adjacent frames captured from the videos can be used as the adjacent images.

At step S3, a three-dimensional point set of the monitoring scene of the plurality of surveillance cameras is reconstructed according to the matching result between the plurality of first images.

This step can be implemented by many methods, such as a SFM (Structure From Motion) method based on an IBA (Incremental Bundle Adjustment) frame (refer to S. Agarwal, N. Snavely, I. Simon, S. Seitz, R. Szeliski. Building Rome in a Day, ICCV, 2009), a SFM method based on discrete belief propagation and Levenberg-Marquardt method (refer to Crandall D, Owens A, Snavely N, et al. Discrete-continuous optimization for large-scale structure from motion[C], CVPR, 2011) or a method based on the GPS information and gesture information obtained by a sensor on the sampling device.

Figure 2:
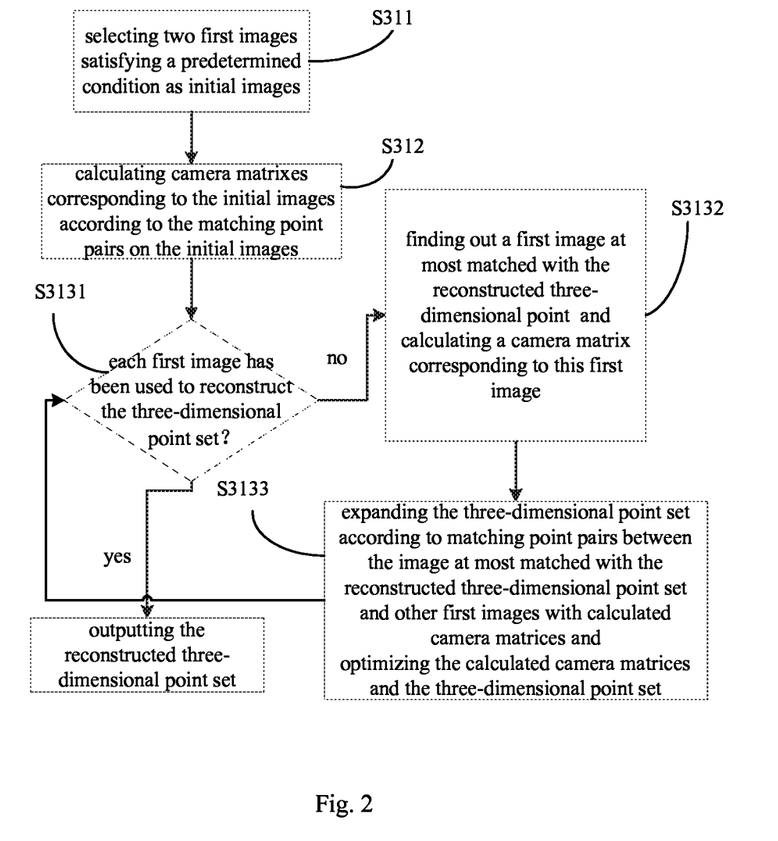
FIG. 2 is a flow chart showing a method for reconstructing a three-dimensional point set in a monitoring scene of a plurality of surveillance cameras according to a matching result between a plurality of images according to an embodiment of the present disclosure.

In an embodiment of the present disclosure, the SFM method based on the IBA frame is used to reconstruct the three-dimensional point set of the monitoring scene. Specifically, the three-dimensional point set of the monitoring scene is reconstructed by following steps.

At step S311, two first images satisfying a predetermined condition are selected from the plurality of first images as initial images. A number of matching point pairs on the initial images is larger than a predetermined threshold and a degradation degree between the initial images is smaller than a predetermined degree.

At step S312, an initial three-dimensional point set is reconstructed according to the initial images.

Firstly, an essential matrix E which satisfies $x_{j1}^T E x_{j2}=0$ is calculated, such as by a five-spot method proposed by David Nister (refer to Nistér D. An efficient solution to the five-point relative pose problem [J]. IEEE Transactions on Pattern Analysis and Machine Intelligence, 2004), in which ($x_{j1}$, $x_{j2}$) is a feature point pair on the initial images. Then, the essential matrix E is decomposed to obtain two camera matrices $P_1$ and $P_2$ corresponding to the initial images respectively (referring to Richard Hartley, "Multiple view geometry in computer vision", Chapter 8, Section 6, a coordinate system corresponding to one of the initial images is used as a world coordinate system, i.e., the camera matrix corresponding to one of the initial images is represented as $P_1=K_1[I|0]$, where $K_1$ is a known intrinsic matrix of the sampling device, I is a 3×3 unit matrix, and 0 is a 3×1 zero vector). Finally, a three-dimensional coordinate $X_j$ of the feature point pair ($x_{j1}$, $x_{j2}$) on the initial images can be obtained according to the camera matrices $P_1$ and $P_2$ by means of a triangulation algorithm.

At step S313, the three-dimensional point set of the monitoring scene is expanded according to the initial three-dimensional point set and other first images except for the initial images, thus obtaining a denser representation of the monitoring scene. Specifically, following steps are executed to expand the three-dimensional point set.

At step S3131, it is determined whether each of the plurality of first images has been used to reconstruct the three-dimensional point set; if yes, the process is stopped and the reconstructed three-dimensional point set is output; if no, execute step S3132.

At step S3132, a first image at most matched with the reconstructed three-dimensional point is found out from images having not been used to reconstruct the three-dimensional point set of the monitoring scene, and a camera matrix corresponding to the first image at most matched with the reconstructed three-dimensional point set is calculated.

The reconstructed three-dimensional point set is denoted as X_set, and a corresponding set of feature points on images with calculated camera matrices (hereinafter referred to as a feature point set corresponding the three-dimensional point set) is denoted as x_set. The first image at most matched with the reconstructed three-dimensional point set is the first image having most feature points matched with the feature points in the set x_set, and a set of these feature points matched with the feature points in the set x_set is denoted as $x\_set_1$. A three-dimensional point set corresponding to the set x_set is a subset of X_set and is denoted as $X\_set_1$. Thus, the camera matrix corresponding to the first image at most matched with the reconstructed three-dimensional point can be calculated according to sets $X\_set_1$ and $x\_set_1$ by means of direct linear transformation.

At step S3133, the three-dimensional point set of the monitoring scene is expanded according to matching point pairs between the first image at most matched with the reconstructed three-dimensional point set and other first images with calculated camera matrices, and the calculated camera matrices and the three-dimensional point set are optimized.

Specifically, all the matching points between the image at most matched with the reconstructed three-dimensional point set and other first images with calculated camera matrices are read (for example, directly read from the matching relationship obtained at step S2) and added into the set x_set. Then, three-dimensional coordinates of these added matching points are calculated by means of the triangulation algorithm and added into the set X_set.

In addition, a bundle adjustment method can be used to optimize the camera matrices and the three-dimensional points. Specifically, the calculated camera matrix $P_i$ and the coordinate of the three-dimensional point $X_j$ can be used as variables to make an iterative optimization to minimize a total back-projection error, i.e., an equation $$\min_{X_j, P_i} \arg \sum_{i=1}^{n} \sum_{j=1}^{m} w_{ij} \|x_{ij} - P_i X_j\|_2$$

(where n is a number of the calculated camera matrices, m is a number of the reconstructed three-dimensional points, $x_{ij}$ is a homogeneous coordinate of the $j^{th}$ feature point in the $i^{th}$ image, $$w_{ij} = \begin{cases} 1, & \text{the } j^{th} \text{ feature point occurring in the } i^{th} \text{ image)} \\ 0, & \text{other conditions} \end{cases}$$

is solved. Solving the equation is a nonlinear least square problem and can be dealt with a LM algorithm (refer to Kenneth Levenberg (1944). "A Method for the Solution of Certain Non-Linear Problems in Least Squares". Quarterly of Applied Mathematics 2: 164-168, the calculated camera matrix $P_i$ and the three-dimensional coordinate $X_j$ can be used as initial values of the iterative optimization).

The steps S3131 to S3133 are repeated until no more three-dimensional point can be found.

In another embodiment of the present disclosure, with the matching result obtained at step S2, the three-dimensional point set X_set of the monitoring scene can be reconstructed by means of the SFM method based on the discrete belief propagation and the Levenberg-Marquardt algorithm. Specific implementations can be referred to Crandall, D., Owens, A., Snavely, N., Huttenlocher, D. P.: Discrete-continuous optimization for large-scale structure from motion. CVPR, 2011, the entire content of which is included herein by reference. A set of images used to reconstruct the three-dimensional point set is denoted as I_set, and a set comprising feature points in the set I_set corresponding to the three-dimensional points in the set X_set is denoted as x_set.

In yet another embodiment of the present disclosure, the three-dimensional point set of the monitoring scene can be directly reconstructed according to the GPS location information and gesture information obtained by the sensor on the sampling device. Specifically, the GPS location information and gesture information corresponding to each of the plurality of first images are obtained and the camera matrix $P_i$ corresponding to each of the plurality of first images is calculated. Subsequently, for each two adjacent first images, the three-dimensional coordinate $X_j$ of the matching point pair $(x_{j1}, x_{j2})$ on the two adjacent first images is calculated according to the camera matrices corresponding to the two adjacent first images by means of the triangulation algorithm. Finally, the camera matrices and the three-dimensional coordinates of the matching point pairs are optimized by means of the bundle adjustment method described at step S3133. The set of the images used to reconstruct the three-dimensional point set is denoted as I_set (since some images do not have matching points with other images, they are not used to reconstruct the three-dimensional point set), the obtained three-dimensional point set is denoted as X_set and the set comprising feature points in I_set corresponding to three-dimensional points in X_set is denoted as x_set.

It should be understood that, those having ordinary skills in the related art can select one of the above three methods according to different requirements and conditions. For example, when a sampling device with a GPS sensor and an angle sensor is used to sample images in the monitoring scene, it is easy to obtain sensor information (location information and angle information obtained by the GPS sensor and the angle sensor). Thus, the third method can be used, and the three-dimensional point set of the monitoring scene can be reconstructed simply and efficiently according to the GPS information and gesture information sampled by the sensors on the sampling device. However, when the angle information, location information or intrinsic parameters of the image (such as internet images and indoor sampled images) is missed, the SFM method based on the IBA frame can be used to reconstruct the three-dimensional point set of the monitoring scene, although a calculating speed of the method is relatively low. The SFM method based on the discrete belief propagation and the Levenberg-Marquardt algorithm is adapted for reconstructing a large-scale scene, during which various prior information of the image (such as lines on the image) can be used to make the reconstruction more accurate, thus providing a high robustness against noises (such as noises of the GPS sensor or angle sensor).

Figure 3:
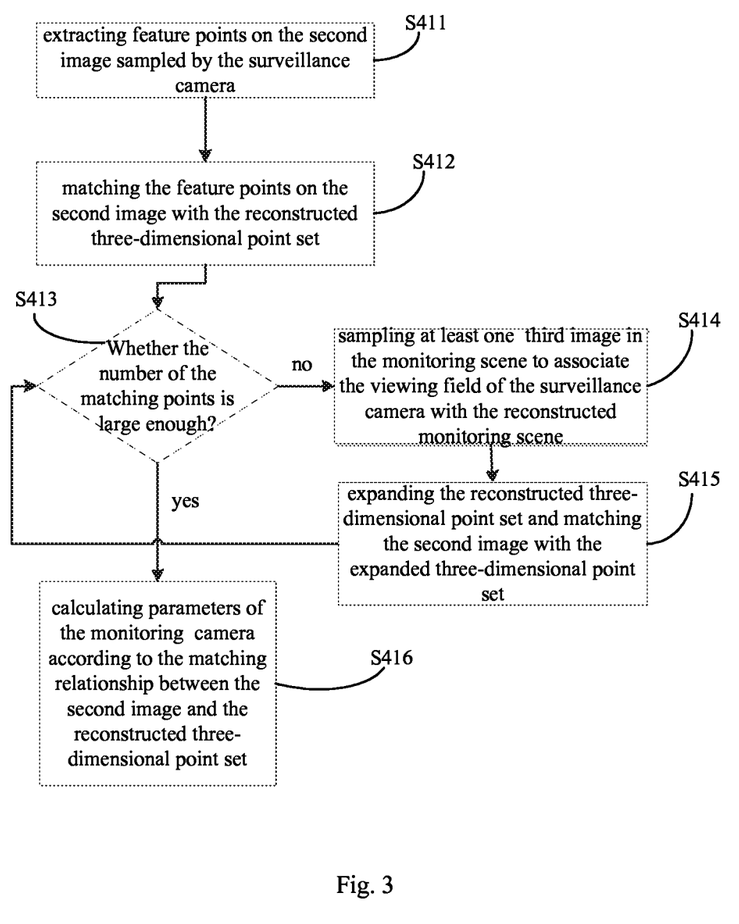
FIG. 3 is a flow chart showing calculating parameters of a surveillance camera according to a reconstructed three-dimensional point set and a second image sampled by a surveillance camera according to an embodiment of the present disclosure.

At step S4, parameters of each of the plurality of surveillance camera are calculated according to the three-dimensional point set and the second image sampled by each of the plurality of surveillance cameras. Specifically, following steps are carried out to calculate the parameters of each surveillance camera.

At step S411, the second image sampled by the surveillance camera is matched with the first images used to reconstruct the three-dimensional point set respectively to obtain a first feature point set.

At step S412, the first feature point set is matched with the feature point set corresponding to the reconstructed three-dimensional point set.

The second image sampled by the surveillance camera is matched with each image in I_set, and a set comprising matched feature points (i.e., the first feature point set) denoted as x_set' is obtained. Then, an intersection set between x_set' and x_set is calculated and denoted as x_result. Three-dimensional coordinates of points in x_result have been reconstructed (recorded in X_set). When a number of points in x_result is large enough, the camera matrix of the surveillance camera can be calculated according to the points in x_result.

At step S413, it is determined whether the number of feature points in the intersection set x_result is larger than a predetermined number. In an embodiment of the present disclosure, the predetermined number is 10.

At step S414, when the number of feature points in the intersection set x_result is smaller than the predetermined number, at least one third image is sampled by the sampling device in the monitoring scene of the plurality of surveillance cameras.

When the number of feature points in the intersection set x_result is smaller than the predetermined number, some images close to the viewing filed of the surveillance camera and having a relatively large area overlapped with the viewing field of the previously sampled first images are sampled. For example, when a mounting height of the surveillance camera is 10 m and an erecting height of the sampling device at step S1 is 2 m, some images can be sampled at the height of 4 m, 6 m or 8 m. By sampling more images, the three-dimensional point set of the monitoring scene is expanded, such that more feature points on the images sampled by the surveillance camera can be matched with the reconstructed three-dimensional point set of the monitoring scene, thus improving the calibration precision.

At step S415, the reconstructed three-dimensional point set X_set and the intersection set x_result are expanded by the at least one third image.

Specifically, features points on the third image are extracted and matched with the each image in I_set (by the same method as described at step S2), and a set comprising matched feature points is denoted as x_new. Then, an intersection set between x_set and x_new is obtained and denoted as $x\_set_2$, and a three-dimensional point set corresponding to $x\_set_2$ which is a subset of X_set is obtained and denoted as $X\_set_2$. Subsequently, a direct linear transformation is performed on the sets $x\_set_2$ and $X\_set_2$ to calculate a camera matrix corresponding to the third image. Finally, the at least one third image is added into I_set, all the points in x_new are added into x_set, and three-dimensional coordinates of these newly added points in x_set (i.e., points except for points in x_set$_2$) are calculated by the triangulation algorithm and added into X_set.

The above steps are repeated until the number of points in x_result is larger than the predetermined number.

At step S416, when the number of points in x_result is larger than the predetermined number, the parameters of the surveillance camera are calculated.

Firstly, a three-dimensional point set X_result (a subset of X_set) corresponding to x_result is obtained. Then, the direct linear transformation (refer to "Multiple view geometry in computer vision", Chapter 2 Section 5) or p4p method (refer to M. Bujnak, Z. Kukelova, T. Pajdla. A general solution to the P4P problem for camera with unknown focal length. CVPR 2008, Anchorage, Ak., USA, June 2008) is performed on the sets x_result and X_result to calculate an intrinsic matrix (including a focal distance of the surveillance camera) and external parameters (a rotation matrix of the coordinate system of the surveillance camera with respect to the world coordinate system and a location of an optical center of the surveillance camera) of surveillance camera. The p4p method is stable, but just adapted for a condition in which the intrinsic matrix has only one unknown parameter (i.e., supposing that the principal point of the surveillance camera is a center of the image and the image is not distorted). All the intrinsic parameters (the focal distance, a coordinate of the principle point and the distortion factor) of the surveillance camera can be calculated by the direct linear transformation, but this method is not stable enough. For the sake of clarity, these two methods will not be described in detail herein.

Figure 4:
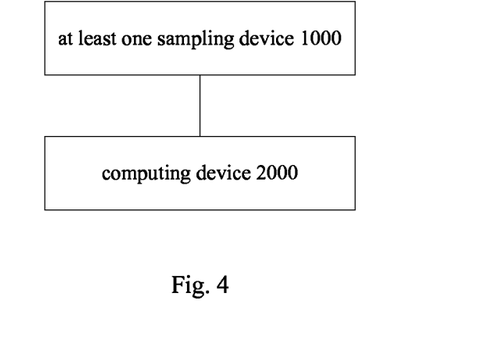
FIG. 4 is a block diagram of a system for calibrating a plurality of surveillance cameras according to an embodiment of the present disclosure.

According to embodiments of the present disclosure, a system for calibrating a plurality of surveillance cameras is provided. FIG. 4 is a block diagram of a system for calibrating a plurality of surveillance cameras according to an embodiment of the present disclosure. As shown in FIG. 4, the calibrating system includes at least one sampling device 1000 and a computing device 2000.

The at least one sampling device 1000 is configured to sample a plurality of first images in a monitoring scene of the plurality of surveillance cameras. The computing device 2000 is configured to perform a feature matching on the plurality of first images to obtain a matching result between the plurality of first images, to reconstruct a three-dimensional point set of the monitoring scene of the plurality of surveillance cameras according to the matching result, and to calculate parameters of each of the plurality of surveillance cameras according to the three-dimensional point set and a second image sampled by each of the plurality of surveillance cameras.

In an embodiment of the present disclosure, the at least one sampling device 1000 may include a GPS sensor. When the at least one sampling device 1000 includes the GPS sensor, adjacent images of each of the plurality of first images can be obtained according to the GPS location information sampled by the GPS sensor when the sampling device 1000 samples the plurality of first images. Then, the adjacent images can be matched with each other, thus improving the matching efficiency. The at least one sampling device 1000 may also sample images actively.

A working process of the computing device 2000 can be referred to above description, which will be omitted herein.

With the calibrating method and system according to embodiments of the present disclosure, the three-dimensional point set of the monitoring scene can be accurately reconstructed according to the relatively complete image information of the monitoring scene obtained by the sampling device, and the camera matrices of the surveillance cameras can be calculated according to the relationship between the three-dimensional point set and the feature point set on the second image sampled by the surveillance camera, thus achieving the calibration of the surveillance camera. Moreover, the calibrating process is dynamic, i.e., when the number of the reconstructed three-dimensional points is not large enough to calibrate the surveillance cameras, more images can be sampled to expand the reconstructed three-dimensional point set, thus ensuring that all the surveillance cameras can be calibrated. Compared with conventional calibrating methods, the calibrating method in the present disclosure does not require a calibration object, a special motion of the surveillance camera or overlapped viewing fields of the surveillance cameras. Rather, the calibrating method according to embodiments of the present disclosure can calibrate a plurality of surveillance cameras simultaneously as long as the sampling device samples the images of the monitoring scene to associate the viewing fields of the surveillance cameras with each other. The method according to embodiments of the present disclosure does not require the plurality of surveillance cameras to be synchronous, and can deal with conditions in which the viewing fields the surveillance cameras do not overlap with each other. When a street view car is used to sample the images, an intelligent analysis of a surveillance camera network in a city level can be implemented.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for calibrating a plurality of surveillance cameras, comprising:
sampling a plurality of first images in a monitoring scene of the plurality of surveillance cameras by a sampling device and sampling a second image in the monitoring scene by each of the plurality of surveillance cameras;

performing a feature matching on the plurality of first images to obtain a matching result between the plurality of first images;
reconstructing a three-dimensional point set of the monitoring scene according to the matching result between the plurality of first images; and
calculating parameters of each of the plurality of surveillance cameras according to the three-dimensional point set and the second image sampled by each of the plurality of surveillance cameras,
wherein reconstructing a three-dimensional point set of the monitoring scene according to the matching result between the plurality of first images comprises:
selecting two first images from the plurality of first images as initial images, in which a number of matching point pairs on the initial images is larger than a predetermined threshold and a degradation degree between the initial images is smaller than a predetermined degree;
calculating camera matrices corresponding to the initial images according to the matching point pairs on the initial images;
reconstructing an initial three-dimensional point set of the monitoring scene according to the matching relationship between the initial images;
expanding the three-dimensional point set of the monitoring scene according to the initial three-dimensional point set and other first images except for the initial images,
or, wherein reconstructing a three-dimensional point set of the monitoring scene according to the matching result between the plurality of first images comprises:
obtaining GPS location information and gesture information corresponding to each of the plurality of first images and calculating the camera matrix corresponding to each of the plurality of first images according to the GPS location information, the gesture information and the intrinsic parameters of the sampling device;
for each two adjacent first images, calculating three-dimensional coordinates of matching points on the two adjacent first images according to the camera matrices corresponding to the two adjacent first images by means of a triangulation algorithm;
optimizing the camera matrices and the three-dimensional coordinates of the matching points by means of a bundle adjustment method.

2. The method according to claim 1, wherein sampling a plurality of first images in a monitoring scene of the plurality of surveillance cameras by a sampling device comprises:
calibrating intrinsic parameters of the sampling device;
sampling the plurality of first images in the monitoring scene of the plurality of surveillance cameras by the sampling device with calibrated intrinsic parameters, in which at least some of the plurality of first images have an area overlapped with a total viewing field of the plurality of surveillance cameras and larger than a predetermined area threshold.

3. The method according to claim 1, wherein performing a feature matching on the plurality of first images to obtain a matching result between the plurality of first images comprises:
when the sampling device has a GPS sensor, obtaining first images adjacent to each other according to GPS location information obtained during sampling the plurality of first images, and matching the adjacent first images with each other; and
when the sampling device has no GPS sensor, matching the plurality of first images with each other.

4. The method according to claim 1, wherein expanding the three-dimensional point set of the monitoring scene according to the initial three-dimensional point set and other first images except for the initial images comprises:
determining whether each of the plurality of first images has been used to reconstruct the three-dimensional point set of the monitoring scene;
if no, finding out a first image at most matched with the reconstructed three-dimensional point set from images having not been used to reconstruct the three-dimensional point set of the monitoring scene, and calculating a camera matrix corresponding to the first image at most matched with the reconstructed three-dimensional point set;
expanding the three-dimensional point set of the monitoring scene according to matching point pairs between the first image at most matched with the reconstructed three-dimensional point set and other first images with calculated camera matrices;
optimizing the calculated camera matrices and three-dimensional coordinates of points in the three-dimensional point set.

5. The method according to claim 1, wherein calculating parameters of each of the plurality of surveillance cameras according to the three-dimensional point set and the second image sampled by each of the plurality of surveillance cameras comprises:
for each surveillance camera to be calculated, matching the sampled second image with the first images used to reconstruct the three-dimensional point set of the monitoring scene respectively to obtain a first feature point set, and calculating an intersection set between the first feature point set and a feature point set corresponding to the three-dimensional point set, in which the feature point set corresponding to the three-dimensional point set comprises points located on the first images used to reconstruct the three-dimensional point set and corresponding to points in the three-dimensional point set;
determining whether a number of feature points in the intersection set is larger than a predetermined number;
if no, sampling at least one third image in the monitoring scene of the plurality of surveillance cameras by the sampling device and expanding the three-dimensional point set according to the at least one third image, so as to obtain an updated intersection set in which the number of feature points is larger than the predetermined number;
calculating the parameters of the surveillance camera to be calibrated according to the updated intersection set and a three-dimensional point set corresponding to the updated intersection set.

6. A system for calibrating a plurality of surveillance cameras, comprising:
at least one sampling device, configured to sample a plurality of first images in a monitoring scene of the plurality of surveillance cameras; and
a computing device, configured to perform a feature matching on the plurality of first images so as to obtain a matching result between the plurality of first images, to reconstruct a three-dimensional point set of the monitoring scene of the plurality of surveillance cameras according to the matching result between the plurality of first images, and to calculate parameters of each of the plurality of surveillance cameras according to the three-dimensional point set and a second image sampled by each of the plurality of surveillance cameras, wherein the computing device is configured to:

select two images from the plurality of first images as initial images, in which a number of matching point pairs on the initial images is larger than a predetermined threshold and a degradation degree between the initial images is smaller than a predetermined degree;

calculate camera matrices corresponding to the initial images according to the matching point pairs on the initial images;

reconstruct an initial three-dimensional point set of the monitoring scene of the plurality of surveillance cameras according to the matching relationship between the initial images and the camera matrices corresponding to the initial images; and expand the three-dimensional point set of the monitoring scene according to the initial three-dimensional point set and other first images except for the initial images, or, wherein the computing device is configured to:

obtain GPS location information and gesture information corresponding to each of the plurality of first images and calculate the camera matrix corresponding to each of the plurality of first images according to the GPS location information, the gesture information and the intrinsic parameters of the at least one sampling device;

calculate three-dimensional coordinates of matching points on each two adjacent first images according to the camera matrices corresponding to the two adjacent first images by means of a triangulation algorithm; and optimize the camera matrices and the three-dimensional coordinates of the matching points by means of a bundle adjustment method.

7. The system according to claim 6, wherein intrinsic parameters of the at least one sampling device are calibrated, and the at least one sampling device with calibrated intrinsic parameters actively samples the plurality of first images in the monitoring scene of the plurality of surveillance cameras, in which at least some of the plurality of first images have an area overlapped with a total viewing field of the plurality of surveillance cameras and larger than a predetermined area threshold.

8. The system according to claim 6, wherein the computing device is further configured to:

determine whether each of the plurality of first images has been used to reconstruct the three-dimensional point set of the monitoring scene;

if no, find out a first image at most matched with the reconstructed three-dimensional point set from images having not been used to reconstruct the three-dimensional point set of the monitoring scene, and calculate a camera matrix corresponding to the first image at most matched with the reconstructed three-dimensional point set;

expand the three-dimensional point set of the monitoring scene according to matching point pairs between the first image at most matched with the reconstructed three-dimensional point set and other first images with calculated camera matrices; and optimize the calculated camera matrices and three-dimensional coordinates of points in the three-dimensional point set.

9. The system according claim 6, wherein the computing device is further configured to:

match the second image sampled by each of the plurality of surveillance cameras with the first images used to reconstruct the three-dimensional point set of the monitoring scene respectively to obtain a first feature point set, and calculate an intersection set between the first feature point set and a feature point set corresponding to the three-dimensional point set, in which the feature point set corresponding to the three-dimensional point set comprises points located on the first images used to reconstruct the three-dimensional point set and corresponding to points in the three-dimensional point set;

determine whether a number of feature points in the intersection set is bigger than a predetermined number;

if no, receive at least one third image sampled by the at least one sampling device and expand the three-dimensional point set according to the at least one third image so as to obtain an updated intersection set in which the number of feature points is bigger than the predetermined number; and calculate the parameters of the surveillance camera according to the updated intersection set and a three-dimensional point set corresponding to the updated intersection set.

10. A non-transitory computer-readable storage medium having stored therein instructions that, when executed by a processor of an apparatus, causes the apparatus to perform a method for calibrating a plurality of surveillance cameras, the method comprising:

sampling a plurality of first images in a monitoring scene of the plurality of surveillance cameras by a sampling device and sampling a second image in the monitoring scene by each of the plurality of surveillance cameras;

performing a feature matching on the plurality of first images to obtain a matching result between the plurality of first images;

reconstructing a three-dimensional point set of the monitoring scene according to the matching result between the plurality of first images; and calculating parameters of each of the plurality of surveillance cameras according to the three-dimensional point set and the second image sampled by each of the plurality of surveillance cameras, wherein reconstructing a three-dimensional point set of the monitoring scene according to the matching result between the plurality of first images comprises:

selecting two first images from the plurality of first images as initial images, in which a number of matching point pairs on the initial images is larger than a predetermined threshold and a degradation degree between the initial images is smaller than a predetermined degree;

calculating camera matrices corresponding to the initial images according to the matching point pairs on the initial images;

reconstructing an initial three-dimensional point set of the monitoring scene according to the matching relationship between the initial images;

expanding the three-dimensional point set of the monitoring scene according to the initial three-dimensional point set and other first images except for the initial images, or, wherein reconstructing a three-dimensional point set of the monitoring scene according to the matching result between the plurality of first images comprises:

obtaining GPS location information and gesture information corresponding to each of the plurality of first images and calculating the camera matrix corresponding to each of the plurality of first images according to the GPS location information, the gesture information and the intrinsic parameters of the sampling device;

for each two adjacent first images, calculating three-dimensional coordinates of matching points on the two adjacent first images according to the camera matrices corresponding to the two adjacent first images by means of a triangulation algorithm;

optimizing the camera matrices and the three-dimensional coordinates of the matching points by means of a bundle adjustment method.

* * * * *